UNITED STATES PATENT OFFICE.

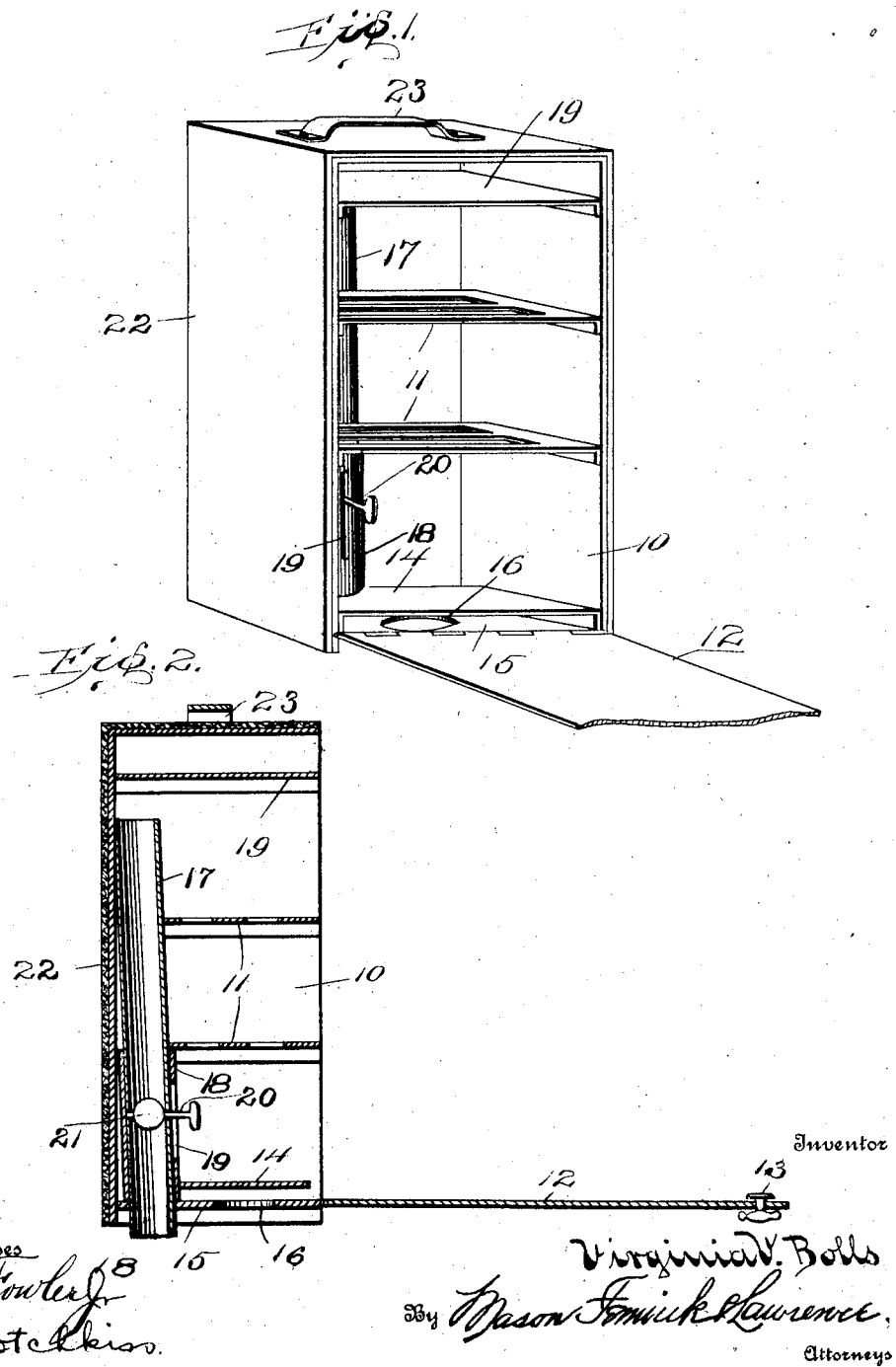

VIRGINIA V. BOLLS, OF ROCKPORT, TEXAS.

OVEN.

No. 907,102.   Specification of Letters Patent.   Patented Dec. 15, 1908.

Application filed October 8, 1907. Serial No. 396,512.

*To all whom it may concern:*

Be it known that I, VIRGINIA V. BOLLS, a citizen of the United States, residing at Rockport, in the county of Aransas and State of Texas, have invented certain new and useful Improvements in Ovens; and I do hereby declare the following to be a full, clear, and exact description of the invention, such as will enable others skilled in the art to which it appertains to make and use the same.

This invention relates to ovens, and especially to that class of ovens employed as auxiliary to an open burner, as, for instance, a gas or oil burner, and has for an object to provide an oven embodying new and improved features of convenience, reliability and economy.

A further object of the invention is to provide in an oven a plurality of openings adapted to receive heat from a burner interchangeably and to conduct the heat to different parts of the oven for different classes of baking.

A further object of the invention is to provide in an oven an opening formed in the bottom thereof adapted to conduct heat from the burner to the oven in substantially the usual and ordinary manner and with an auxiliary opening also in the bottom of the oven in communication with a conduit or conductor adapted to conduct the heat from the burner directly to the upper part of the oven.

With these and other objects in view, the invention consists of certain novel constructions, combinations and arrangements of parts, as will be hereinafter fully described.

In the drawings: Figure 1 is a perspective view of the improved oven shown with the closure or front door open. Fig. 2 is a vertical, transverse sectional view of the oven, sectioning also the heat conduit.

Like characters of reference designate corresponding parts throughout the several views.

The oven forming the subject-matter of this application comprises a body portion 10 of substantially the usual and ordinary form, size and material, and provided with any approved number of shelves or grates 11 for supporting material to be baked within the oven and provided with openings to permit the heat to pass therethrough and circulate within the oven in substantially the usual and ordinary manner. The oven is also provided with a closure 12 of any approved form, here shown as a door hinged horizontally at the bottom and opening outwardly and downwardly, and with any approved form of fastening or securing means, as the turn button 13. Adjacent the bottom of the oven, a deflector or baffle plate 14 is disposed, spaced somewhat away from the bottom 15 of the oven and also away from the front and rear edges of the oven to permit the heat to pass about the edges of the said baffle plate and into the baking chamber of the oven.

Beneath the baffle plate 14 an opening 16 is formed in the bottom 15 in such position that heat from the burner disposed beneath the bottom of the oven passes through the opening and directly into contact with the baffle plate 14 and about the edges of the said baffle into the heating chamber and upwardly through the openings in the shelves or grates 11 in substantially the usual manner.

As auxiliary to the flue opening 16 an adjustable flue 17 is provided, preferably slidable vertically within a sleeve 18 erected over an opening formed in the bottom 15 of the oven adjacent the opening 16, but spaced therefrom as at or adjacent to the back wall of the oven.

The sleeve 18 is provided with a slot 19 through which extends the spindle 20 of a damper 21 mounted to rotate within the flue 17 and to control the passage of heated air therethrough.

The flue 17 is movable as described in the sleeve 18 so that it may be moved downwardly below the bottom of the oven to embrace the burner disposed beneath the oven and to prevent the escape of heat from the burner into the atmosphere or upwardly through the opening 16 when it is desired to concentrate the heat passing through the flue 17.

The oven is preferably surrounded and embraced except at the bottom by a heat non-conducting hood or cover member 22 composed of asbestos or similar material and provided with a handle 23 by which the hood or cover may be removed from the oven when desired.

In use the oven may be employed in the usual and ordinary manner by locating the opening 16 immediately above the burner, but if it is desired to employ the upper shelf of the oven for browning or similar purposes the flue 17 is employed and may be moved slidably downward as above described to contact with or embrace the burner and direct the entire heat from the burner upwardly through the flue and into contact with the under surface of the deflector 19 and thence downwardly upon the surface of the material disposed upon the upper shelf 11.

My adjustable flue is the principal feature of my invention. My flue heats the top of the oven so intensely that I am able to cook on the top of it. I do my boiling on the top of my oven while I am broiling and baking inside; thus the one flame cooks a complete meal all at the same time.

The term "bottom" as used in the specification and claims means the bottom horizontal sheet 15 as distinguished from the lower end of the oven structure.

I claim:

1. In an oven, a body provided with an opening formed in the bottom thereof, a flue slidable vertically through the opening, and terminating short of the top of the oven, and a baffle plate disposed above the upper end of the flue.

2. In an oven, a body portion provided with a vertical flue slidable vertically and adapted to direct heated air to the upper part of the oven, and a damper within the flue and movable therewith adapted to control the flow of heated air within the flue.

In testimony whereof I affix my signature in presence of two witnesses.

VIRGINIA V. BOLLS.

Witnesses:
　J. C. HENDERSON,
　GEO. M. HOOPER.